Feb. 11, 1969  V. R. MAXWELL  3,426,639
SLIDE TYPE MUSICAL WIND INSTRUMENT
Filed June 1, 1967  Sheet 1 of 2
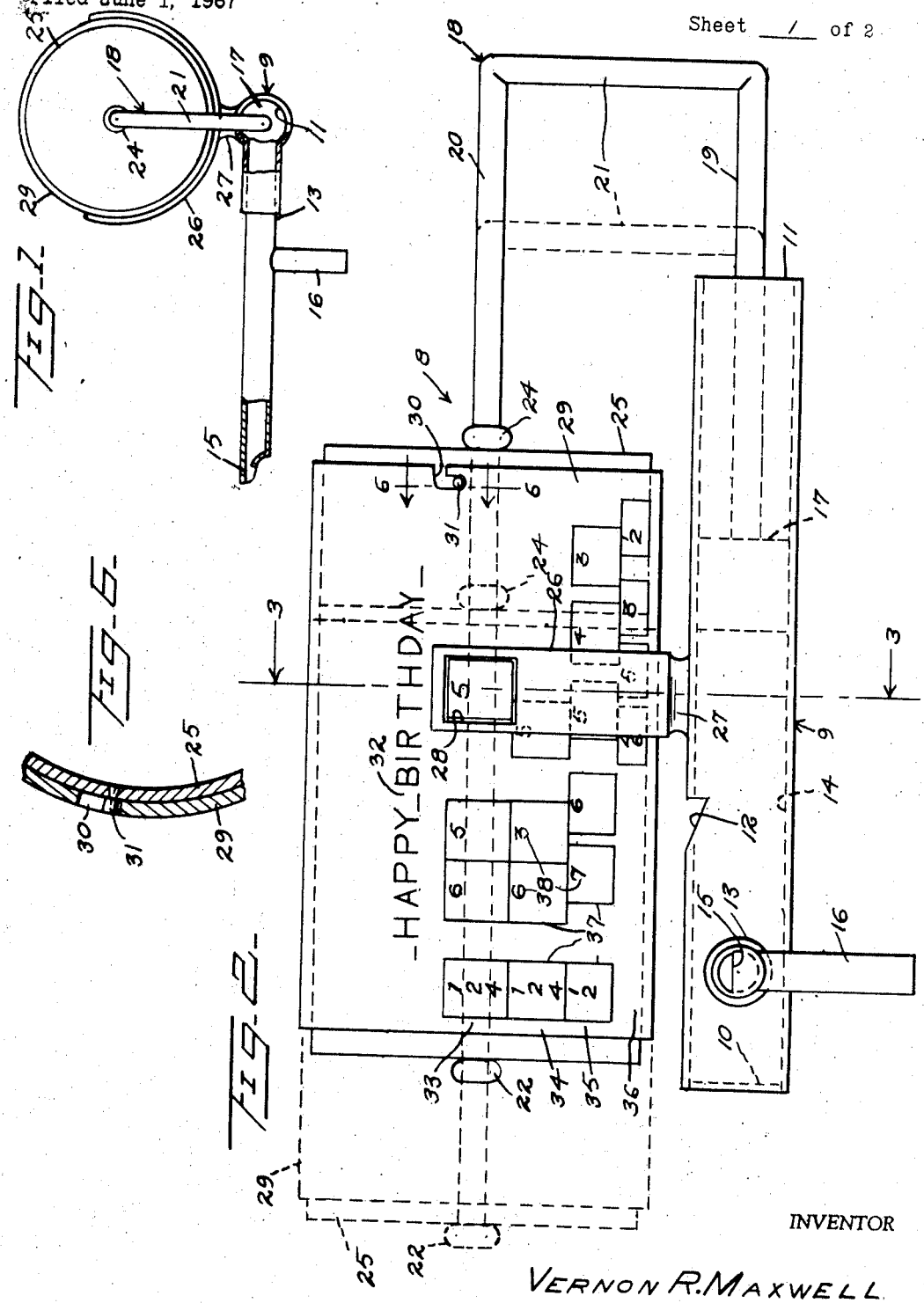
INVENTOR
VERNON R. MAXWELL
BY John N. Randolph
ATTORNEY Feb. 11, 1969  V. R. MAXWELL  3,426,639
SLIDE TYPE MUSICAL WIND INSTRUMENT
Filed June 1, 1967  Sheet 2 of 2
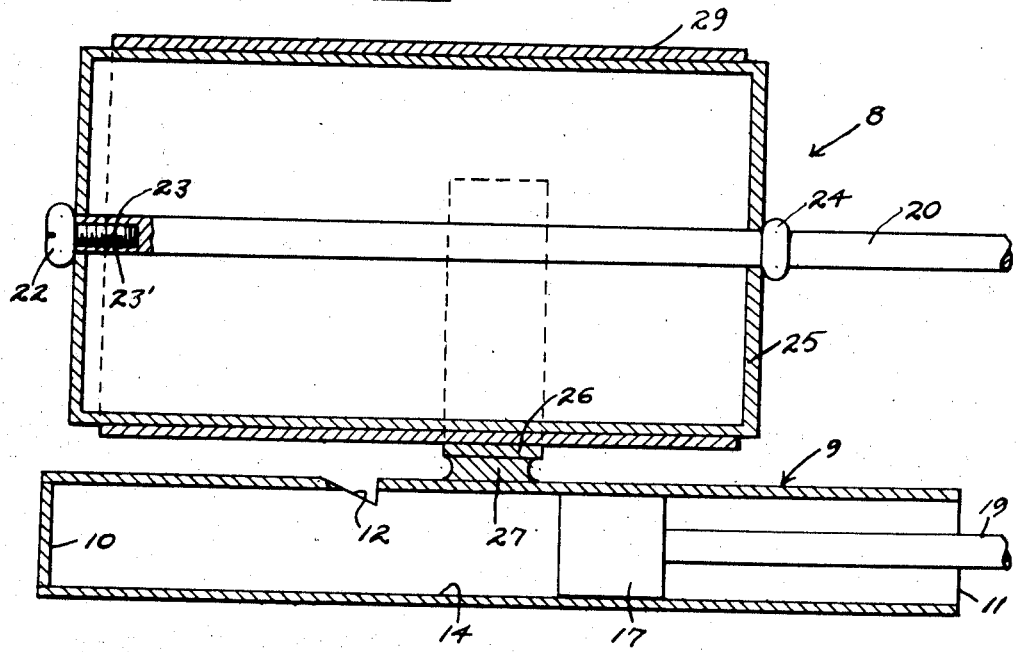
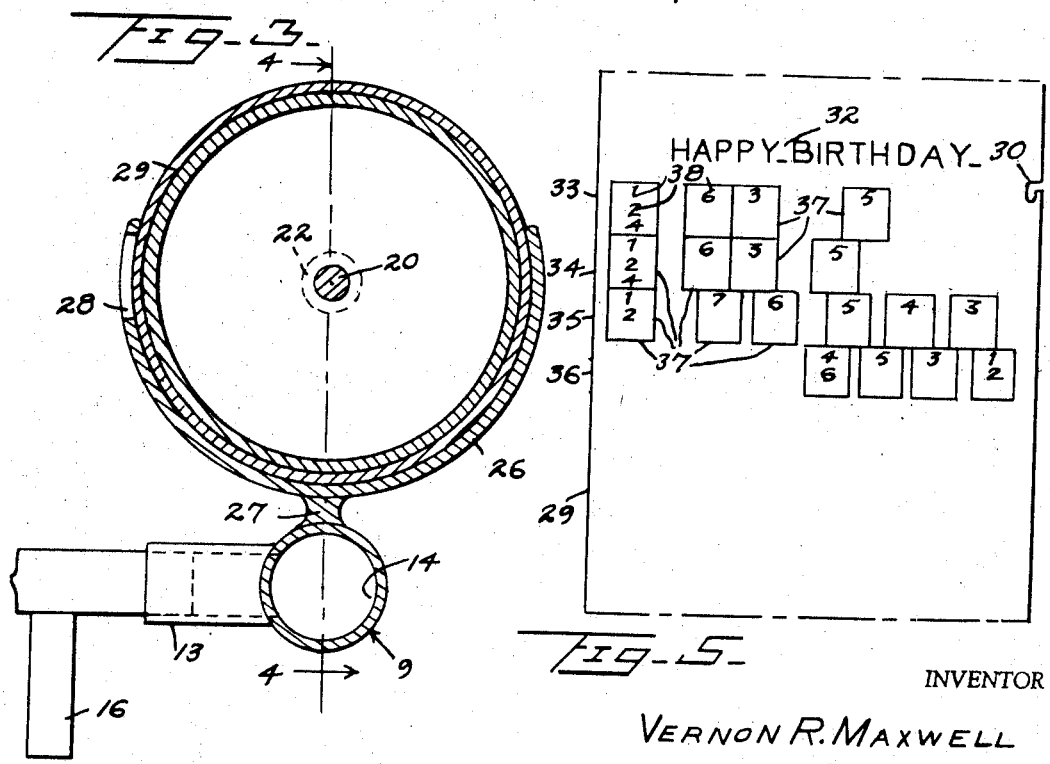
INVENTOR
VERNON R. MAXWELL
BY John N. Randolph
ATTORNEY

United States Patent Office 3,426,639
Patented Feb. 11, 1969

3,426,639
SLIDE TYPE MUSICAL WIND INSTRUMENT
Vernon R. Maxwell, 323½ E. 5th St.,
Marion, Ind. 46952
Filed June 1, 1967, Ser. No. 642,772
U.S. Cl. 84—330
Int. Cl. G10d 7/00, 7/10; G09b 15/02
6 Claims

ABSTRACT OF THE DISCLOSURE

A musical wind instrument of the slide type having a slide device for moving a piston to vary the effective size of a wind pipe whereby different notes can be sounded by blowing through the instrument. A guide which is attached to the slide device visually indicates successive positions to which said guide, the slide device and piston are to be moved as a unit to enable a person having no musical training or talent to readily play tunes on the instrument.

Background of the invention

The present invention relates to the art of toy musical instruments of the wind or whistle type and more particularly to means to enable the playing of tunes on such instruments by persons who are not musically talented.

The prior art includes musical wind instruments having visual means to enable a person not capable of reading music to play simple tunes by following a guide usually in the form of a succession of numerals.

Summary

It is a primary object of the invention to provide a greatly simplified visual guide by the manipulation of which the effective size of the wind pipe of the instrument will be varied to enable the playing of tunes by persons having no musical skill.

Another object of the invention is to provide such a musical guide so associated with a fixed part of the musical instrument having a viewing window, that successive numerals on the visual guide may be accurately positioned in registration with the viewing window for accurately positioning a piston, which is connected to the guide, in different positions within the wind pipe whereby the notes of a tune may be accurately sounded in correct sequence.

A further object of the invention is to provide a visual guide which has readily replaceable note indicating guides so that different guides having different arrangements of note indicating indicia for use in the playing of different tunes may be readily employed interchangeably.

Another object of the invention is to provide a musical instrument of the aforedescribed type of extremely simple construction, which is very durable and yet which may be very economically produced, to enable the instrument to be marketed as a toy.

Various other objects and advantages of the invention will hereinafter become more fully apparent from the following description of the drawings, illustrating a presently preferred embodiment thereof, and wherein:

Brief description of the drawings

FIGURE 1 is an end elevational view, partly in section, of the musical instrument, looking from right to left of FIGURE 2;

FIGURE 2 is an enlarged side elevational view of the musical instrument, looking from left to right of FIGURE 1;

FIGURE 3 is a cross sectional view taken substantially along a plane as indicated by the line 3—3 of FIGURE 2;

FIGURE 4 is a fragmentary longitudinal, central vertical sectional view, taken substantially along a plane as indicated by the line 4—4 of FIGURE 3;

FIGURE 5 is an extended or blank view of one part of the instrument, and

FIGURE 6 is an enlarged fragmentary sectional view taken substantially along the line 6—6 of FIGURE 2.

Description of the preferred embodiment

Referring more specifically to the drawings, the musical instrument in its entirety is designated generally 8 and includes a long straight rigid tube or wind pipe 9 having a closed end 10 and an opposite open end 11. The tube 9 has an upwardly opening air escape port 12 which is disposed nearer the closed end 10 than the open end 11. A rigid branch tube 13 extends laterally from the tube 9, between the escape port 12 and its closed end 10, and communicates with a chamber 14 of said tube 9. The branch tube 13 is normally disposed in substantially a horizontal position, as illustrated in FIGURES 1, 2 and 3, and terminates at its outer end in a mouthpiece 15. A handle 16 extends downwardly from a portion of the tube 13.

A piston 17 is slidably mounted in the pipe 9, between the port 12 and the open end 11, and combines with the end wall 10 to form the air chamber 14. A U-shaped rod 18 has two legs or rod portions 19 and 20 extending in the same direction from its intermediate portion 21 and which are disposed in spaced apart substantially parallel relation to one another. The lower leg 19 extends through the open pipe end 11 and has its terminal fixed to the piston 17. The longer, upper leg 20 is disposed above and spaced from the wind pipe 9 and terminates in a knob 22 which preferably constitutes the head of a screw 23 which, as seen in FIGURE 4, fits threadedly in a socket 23' of the terminal of the rod portion 20 so that the knob 22 may be detached. A drum 25 is rotatably mounted on the rod portion 20 between the knob 22 and an enlargement 24 of said rod portion.

A yoke 26, constituting somewhat more than a semicircle, is connected intermediate of its ends by a base portion 27 to a part of the top portion of the pipe 9, at a point spaced from the port 12, so that the yoke 26 is disposed above the pipe 9 and opens upwardly. The yoke 26 fits concentrically around a part of the drum 25 and is spaced slightly therefrom. The portion of the yoke 26, which faces toward the mouthpiece 15, has a rectangular opening 28 in the terminal portion thereof forming a viewing opening or window.

A cylinder 29, preferably formed of plastic, is mounted detachably on the drum 25 and has a bayonet slot 30 at the inner end thereof to receive a pin 31 which projects from the periphery of the drum 25, to detachably fasten the cylinder to the drum. As seen in FIGURE 3, the cylinder 29 fits snugly but turnably in the yoke 26 so that said yoke will provide a support for the cylinder and drum.

As seen in FIGURES 2 and 5, the cylinder 29 has indicia printed thereon including a top line 32 constituting the title of a song or piece of music, herein indicated as "Happy Birthday." Beneath the title line 32 are four lines 33, 34, 35 and 36, arranged consecutively and each containing a series of borders 37 in each of which apepars one or more numerals 38.

To play the instrument 8, the handle 16 is grasped with the left hand to support the instrument and the cylinder 29 is turned with the drum 25 by the right hand to position the first line 33 in alignment with the window 28. The rod 18 is moved to move the drum 25 and cylinder 29 until the border 37 of the line 33 containing the numerals "1," "2" and "4," is in registration with and visible through the window 28. It will be apparent that the piston 17 will move with the rod 18 to assume a position adjacent the open pipe end 11 for substantially enlarging the chamber 14. The user then blows through the mouthpiece twice to blow the first two corresponding notes represented by the numerals "1" and "2" which are both located in the same border 37. The rod 18 is then moved from right to left to locate the border containing the numeral "3" in the window 28, thereby moving the piston 17 inwardly of the wind pipe 9 to reduce the size of the chamber 14, after which the third note is blown. The rod 18 is then returned to its previous position to locate the first border 37, which also contains the numeral "4," in the window 28, so that the fourth note can be blown. The rod 18 is then moved to the right to the position of the parts as shown in FIGURE 2, with the border 37 containing the numeral "5" in the window 28, and the fifth note is then blown, after which the rod 18 is moved to the border containing the numeral "6" and the last note of the line 33 is then blown.

The drum 25 and cylinder 29 are then turned clockwise, as seen in FIGURES 1 and 3, to position the window 28 in alignment with the second line 34. The notes of the second line are then blown in the same manner as heretofore described with reference to the first line 33, after which the notes of lines 35 and 36 are blown by repeating the operations heretofore described.

It will be noted that the borders 37 of the different lines are disposed at different spaced positions longitudinally of the cylinder 29 to vary the size of the sound chamber 14 for the various notes to be sounded. Where the same note is repeated more than once in a single line, the border 37 which is correctly located for said note will contain more than one numeral and such border will be brought back into registration with the window 28 in the proper sequence for the numerals contained therein, or remain in registration with the window 28 where consecutive numerals appear in a single border.

The mouthpiece 15 is spaced a sufficient distance from the yoke 26 so that the user can readily read the numerals exposed in the window 28 while his mouth is engaging the mouthpiece.

It will also be apparent that different cylinders 29 containing indicia for different songs or music may be readily mounted interchangeably on the drum 25 and that the different songs and music may include a greater or lesser number of lines than is illustrated in FIGURES 2 and 5.

I claim as my invention:

1. A slide type musical wind instrument comprising a wind pipe having a closed end and an air escape port spaced from said end, a mouthpiece supported by, laterally spaced from and communicating with the wind pipe between said closed end and the air escape port, a piston slidably mounted in the wind pipe between the other end thereof and the air escape port and combining with said closed end to form a variable chamber of the wind pipe, a rod having laterally spaced rod portions, one of said rod portions extending into the wind pipe through said other end thereof and being connected to the piston, a drum journaled on the other rod portion and movable with the rod and piston longitudinally of the wind pipe, said drum being laterally spaced from the wind pipe, a stationary window supported by the wind pipe in close proximity to a portion of the periphery of said drum, and indicia bearing means supported by said drum and movable therewith relative to the rod and in unison with the rod and piston for positioning different indicia on said indicia bearing means in registration with said window.

2. A musical instrument as in claim 1, said indicia bearing means comprising a cylinder detachably mounted on the drum and containing circumferentially spaced rows of indicia.

3. A musical instrument as in claim 2, certain of said rows of indicia including a plurality of rectangular borders each containing at least one of a consecutive group of numerals, said borders of the different rows being differently spaced relative to one another and to the borders of the other rows.

4. A musical instrument as in claim 2, and means for detachably fastening said cylinder to the drum.

5. A musical instrument as in claim 1, and a yoke fixed to and extending upwardly from a portion of the wind pipe and fitting concentrically around a portion of the drum and said indicia bearing means and providing a support for the drum, said viewing window comprising an opening in said yoke.

6. A musical instrument as in claim 5, said viewing window being disposed to face toward said mouthpiece, and said mouthpiece being spaced from the yoke a sufficient distance so that the indicia exposed through the window may be read by a user whose mouth is applied to the mouthpiece.

References Cited

UNITED STATES PATENTS

| 2,567,888 | 9/1951 | Meyers | 84—377 |
| 2,778,263 | 1/1957 | Ruben | 84—330 |

RICHARD B. WILKINSON, *Primary Examiner.*

GARY M. POLUMBUS, *Assistant Examiner.*

U.S. Cl. X.R.

84—477; 46—181